Patented May 16, 1944

2,349,227

UNITED STATES PATENT OFFICE 2,349,227

PROCESS FOR PREPARING CONDENSED LOW LACTOSE SKIM MILK FOR STORAGE AND RECOVERY OF LACTOSE THEREFROM

Keith Cartledge Thorneloe, Wilton Woods, Va.; Ava S. Thorneloe executrix of said Keith Cartledge Thorneloe, deceased No Drawing. Application November 20, 1940, Serial No. 366,502

6 Claims. (Cl. 99—56)

The present invention relates to production of condensed skim milk, low in lactose content, useful in the manufacture of ice cream, candy and other confections and the production of lactose therefrom.

In these confections, and particularly so with respect to ice cream, it is desirable in certain markets to have the butter-fat content low—i. e. between 8 to 12 per cent—and to raise the total milk-solids-not-fat as high as practical without causing at least two disadvantages; one, a condition known as "sandiness" in the ultimate product (by which I mean the ice cream or other confection), and, the other, known as "thickening" of the low lactose condensed milk which is used in the ultimate product.

In order to avoid this "sandiness," it is necessary to maintain the percentage of lactose in the free water portion of the ice cream mix at a definite figure, depending upon the treatment the finished ice cream will receive before it is sold, such as the length of time to be held in the ice cream cabinet and the amount of heat shocking it will receive in storage. In practice it is known that where the lactose content of the water plus lactose portion of the ice cream mix is 8.7% or more, the ice cream will not keep indefinitely without going sandy and has a short period of usableness; where the lactose content is not more than 8.0% the ice cream will have medium keeping qualities with respect to developing sandiness under ordinary commercial conditions; and where the lactose content is 7.5% or less the ice cream will have almost indefinite good keeping properties with respect to developing sandiness.

In the treatment of skim milk to produce a product useful for ice cream and other confections high in solids-not-fat, the skim milk is concentrated in the condensing apparatus or vacuum pan to at least 5 to 1, which is a higher concentration than that required or desirable for ordinary condensed skim milk which is between 2½ to 1 and 3 to 1. Consequently, with such a high concentration of skim milk, the condensed product has a tendency to thicken rapidly, which has many disadvantages when it is desired to remove the lactose by crystallization and centrifuging the crystals out, as well as when the condensed skim milk is kept in storage prior to ultimate use; and, it may be further observed here, that when such highly concentrated skim milk with its lactose removed or a substantial part of it removed, the tendency of the condensed product to thicken is accelerated and intensified even at low temperatures.

The present discovery is chiefly concerned with the production of a condensed skim milk product, as above mentioned, and its treatment in a manner as will afford greater efficiency, speed and convenience in the extraction of milk sugar and prevent excessive progressive increase in viscosity or thickening due to aging and storage or by bacteriological decomposition because it is desirable, and at times an economic necessity, to manufacture the product in large quantities at one time or when the milk supply is plentiful and then store it for future use. Such thickening makes the condensed milk very difficult to handle by the ice cream maker or other confectioner because, so thickened, it will in many instances have a consistency of cheese and, even when great care is used to dissolve such thickened condensed milk, the product frequently is lumpy and unsatisfactory.

The object, therefore, of this invention or discovery is to preserve the fluidity of the condensed skim milk in the same degree, or substantially so, as it comes from the condensing apparatus for enabling greater efficiency in the removal of the lactose therefrom and to inhibit thickening to a degree which prevents the treated milk from becoming plastic or semi-plastic, thus allowing the same to be stored for long periods of time while remaining in a condition so that it will readily pour from the storage container and be free from lumpiness and bacterial spoilage.

While United States Patent No. 1,952,017 discloses one method of treating skim-milk to remove the milk sugar or lactose and suggests that cane sugar or sucrose may be added after centrifuging to preserve the product from bacterial spoilage, I have found that by following the teachings of this patent a detrimental effect is produced, due to agitation in the cooling step during crystallization (either by stirring or by flowing or by otherwise keeping the liquid in motion), resulting in the formation of very fine lactose crystals in the crystallizing tank, which crystals cannot be removed in sufficient quantity from the condensed milk by mechanical means and thus resulting in sandiness in the ultimate product; that, in addition, when the condensed skim milk is of a concentration of total solids approximating 70%, or more and produced in a commercial manner according to said patent, the condensed milk usually begins to thicken rapidly and is unmanageable, thus inhibiting the size of the lactose crystal growth and the ease of removal of the lactose crystals; and that the resultant product will thicken at temperatures of as low as 35° F., and above, and within even as short a time as twenty-four hours to a viscosity where it will not pour or only pour with great difficulty and after twenty-four hours will continue to thicken acutely to a plastic mass.

If cane sugar, without water, for preserving purposes, is added, as taught by the aforesaid patent after centrifuging (i. e. at the end of the process), in quantities sufficient to preserve condensed milk from bacterial spoilage, the material will still develop excessive thickness. It is also difficult to keep such sugar in solution because during the thickening process, the sucrose is thrown out of solution so that a homogeneous mixture is not obtained.

On the other hand, I have found that by not subjecting the condensed milk, as taken from the evaporating pan, to a rapid cooling treatment with agitation, I am able to obtain spontaneous crystallization (at temperatures substantially above ordinary room temperatures) of relatively large lactose crystals which may be readily separated mechanically from the other constituents of the concentrated milk; and by introducing sugar (preferably sucrose) and water to the highly concentrated skim milk, after the lactose has crystallized and either before or after centrifuging to recover the lactose crystals, I am able to preserve the condensed skim milk against excessive progressive thickening and bacterial spoilage for indefinite periods of time when said condensed milk is maintained at the usual storage temperature of 50° F., or less, and that, if the said sugar and water is added to the concentrated skim milk prior to centrifuging or separation to recover the lactose, I reduce its viscosity to such a point that the mechanical separation of the lactose crystals from the liquid phase is facilitated in addition to preventing excessive progressive thickening thereof in the finished product obtained. This result is obtained by combining a suitable preserving sugar higher in solubility than lactose (such as sucrose, dextrose or a combination thereof) and water with the condensed milk in such a proportion that there is obtained a finished low-lactose product that has a concentration of sugar, other than lactose, in the water present of between 55% and 65%, by weight of the sugar and water portion, and has in the portion consisting of water and milk-solids-not-fat-other-than-lactose, a concentration of between 25% and 35% of milk-solids-not-fat-other-than-lactose, by weight of the milk-solids-not-fat-other-than-lactose plus the water portion, the latter concentration being higher than that found in normal sweetened condensed skim milk containing all its lactose.

To produce an adequate low-lactose skim milk high in milk-solids-not-fat-other-than-lactose, and to obtain the results above mentioned, I prefer to employ the following exemplary procedure:

Take a batch of about 11,000 pounds of skim milk of good quality, without developed acidity, and add to the skim milk approximately four to seven pounds (preferably an optimum of about 5.9 pounds) of a suitable sugar (preferably sucrose) per 100 pounds of skim milk to assist in preventing thickening during the condensing operation. The batch is preheated to about 145° F. and is held at this temperature for at least thirty minutes to effect pasteurization. The pasteurized skim milk is then run into a condensing apparatus or "vacuum pan" for removing the water to obtain a condensed product containing 70% to 75% of total solids (with an optimum of 72.5%) corresponding to about 35° Bé. at from about 120° F. to 130° F, the Baumé varying with the respective temperatures. However, I prefer to control the introduction of the milk into the condensing device so as to allow just enough milk to enter therein to keep the milk already therein boiling and to gradually reduce the water content of the whole mass in a uniform manner. The vacuum pan or condenser should be operated at as high a vacuum and at as low a temperature as practical—say within a range between twenty-seven and twenty-nine inches of vacuum at a temperature of between 100° F. to 130° F. with an optimum for best results about 120° F.—and should be operated as efficiently as possible to reduce the exposure of the milk, during the condensing operation, to a minimum of motion to avoid self-seeding with too many fine lactose crystals, the same being accomplished by shortening the condensing period to a minimum of time—say from about two to three hours for a vacuum pan operated at normal capacity.

The condensed milk is now transferred directly into a crystallization tank, preferably without extensive circulation through pipes or being pumped or being "seeded" with lactose crystals in any way. This mixture is then allowed to stand under quiescent conditions without agitation to permit crystallization of the major portion of the lactose in the form of relatievly coarse crystals, the area, room or environment in which the mixture so stands being preferably at substantially room temperature; that is, between approximately 70° and 90° F. Since the mixture is taken directly from the vacuum pan without previous cooling or stirring and allowed to stand as just described, it is still very warm and may be as hot as 100 F. to 130 F. degrees at this time when it is first transferred to the crystallizing tank. Therefore, it is somewhat immaterial as to what the temperature is of the room, area or environment in which the crystallizing tank is disposed, because the mixture will lose its heat very slowly, particularly when made up in large commercial batches, possibly losing only 4 to 10 degrees in about 20 hours. Therefore, by ordinary room temperature it is meant here the ambient temperature in which men normally work, and does not refer to the temperature of the mixture in the crystallizing tank.

This crystallization may be carried out in a tank or kettle in which the concentrated skim milk is allowed to stand quiescent without agitation for about twenty hours, more or less. The longer the concentrate stands, without spoilage due to bacterial growth, the greater the crystallization of the lactose. I find, by following this practice, that, as soon as the condensed milk is removed from the vacuum pan and placed in the crystallizing tank and left undisturbed, a spontaneous shower of comparatively few lactose crystals is formed and these crystals grow, during the twenty hours standing period, to a relatively large size (i. e. approximately 0.11 m. m. or .12 m. m. or larger), such as will not clog a centrifuge filter screen of about 200 mesh and thereby will not hinder the centrifuging operation. While not necessary to satisfactory results, I prefer to stir and cool the condensed skim milk after having stood for about twenty hours in the crystallizing tank. This stirring may be for a period of time (say fifteen minutes more or less, depending upon the efficiency of agitation and heat exchange) so as to break up the heavy body that is present in the mass and which heavy body has a tendency to inhibit the free flow of the lactose, still in a supersaturated condition, towards the lactose crystals that are already formed. This stirring will lower the temperature of the mass and it is preferred that it should be lowered to approximately 70° F. although this temperature may vary under conditions and cooling means at hand to between 65° F. and 90° F. By increasing the fluidity of the mass by stirring and by increasing the saturation of the lactose solution by lowering the temperature, there is obtained a further growth in the size of the crystals that are already present during the next four hours in which the mass remains quiescent before the second addition of sugar and water. As a result, I obtain about 70% plus crystallization of the lactose and greater efficiency in the removal of the lactose from the condensed skim milk.

At this point and prior to centriguging I prefer to admix sugar and water mechanically (dextrose or sucrose, but preferably the latter) to the condensed skim milk. To this end, sucrose is dissolved in water free from undesirable impurities and the solution pasteurized or rendered substantially sterile and cooled down to at least 80° F., and then is added gradually to the condensed skim milk with agitation until uniformly incorporated therein. This admixture, containing the lactose crystals is now conveyed to the perforated basket of a centrifugal machine provided with a filter screen having meshed openings of suitable size (about 200 mesh) for removing a substantial portion of the lactose crystals. By this separation step, I recover or separate from the condensed milk at least 55% of the total lactose contained therein, and under very favorable conditions I have recovered about 65%. This percentage is obtained, on the average, more uniformly or constantly than is possible when following the teachings of the patent aforesaid, and results in the uniform production of larger crystals which are more readily washed with a smaller quantity of wash-water and, as a consequence, produces a cleaner milk sugar which can be refined to a U. S. P. product by a very simple and inexpensive process.

The low lactose condensed milk thus obtained is then placed in suitable containers, such as cans, barrels, or large storage receptacles, and stored at a temperature preferably not about 50° F. This condensed milk, when so stored, will remain in a fluid state for an indefinite period without excessive thickening or bacterial decomposition so that it may be readily shipped and easily handled by the confectioner.

To find the amount of preserving sugar and water to be added to the condensed skim milk after crystallization of the lactose, as above described, and in any given situation where the percentage of lactose to be removed is known, and where the desired total percentage of preserving sugar (i. e. first and other additions of sugar) in the sugar (other than lactose) and water phase is known, and the percentage of milk-solids-not-fat-other-than-lactose in the milk-solids-not-fat-other-than-lactose, and water phase is known: (1) determine the per cent total solids in the sweetened skim milk before condensing by adding the pounds of total solids in skim milk to the pounds of first sugar added to each one hundred pounds of skim milk and find the percentage this sum is of the total weight of the skim milk plus the first added sugar; (2) determine the degree of concentration of the condensed milk as it comes from the vacuum pan by dividing the per cent of total solids in this condensed milk by the per cent of total solids in the sweetened skim milk before condensing; (3) determine by analysis of the sweetened uncondensed skim milk in parts per 100 of constituents by multiplying the pounds of first added sugar by the percentage of total solids in the sweetened skim milk before condensing, and divide by the pounds of total solids in the mixture of 100 parts of skim milk and first added sugar, and proceed in like manner for ascertaining the other milk-solids-not-fat-other-than-lactose and for ascertaining the lactose; and (4) determine the calculated percentage analysis of the sweetened milk after condensing (but before removing lactose) by multiplying the percentages of the constituents of the sweetened uncondensed skim milk by the (degree of) concentration. These latter percentages are given in the table below, column I, for purposes of illustration in connection with condensed skim milk containing 71.12% total solids before the centrifuging and before any other (than the first added) sugar and water have been introduced and assuming that there is approximately 4% of the milk-solids-not-fat-other-than-lactose and 5% of lactose in the original unconcentrated skim milk.

TABLE

*For standardizing composition of low-lactose condensed skim milk having 55% preserving sugar and 33% milk solids-not-fat other than lactose expressed in ratios*

|  | I | II | III | IV | V |
|---|---|---|---|---|---|
|  | Percentage composition immediately after concentration of the skim milk | Percentage composition if, for example, 55% lactose removed without addition sugar and water | Parts of finished product made from 100 parts of column II plus column IV | Parts sugar and water added to each 100 lbs. per column II | Percentage composition of finished product |
| Preserving sugar (added at the rate of 5.9 lbs. per 100 lbs. skim milk in columns I and II) | 28.16 | 32.4 | 54.6 | 22.2 | 40.8 |
| Milk solids-not-fat other than lactose | 19.1 | 22.0 | 22.0 |  | 16.5 |
| Lactose | 23.86 | 12.4 | 12.4 |  | 9.2 |
| Water | 28.88 | 33.2 | 44.7 | 11.5 | 33.5 |
| Totals | 100.00 | 100.00 | 133.7 | 33.7 | 100.00 |

In the selected example, as shown in column I of the above table where the total solids is 71.12% in the condensed skim milk, and where it is assumed that approximately 55% of the lactose is to be removed, a simple calculation will determine the calculated percentage of the composition of the low-lactose condensed product, as per column II in the above table.

These factors being determined, sugar (preferably sucrose) and water is added to the composition given in column II in the above table so that the total added preserving sugar (i. e. the first and other added sugar) will be between 55% and 65% in the water and sugar phase and so that the milk-solids-not-fat-other-than-lactose will be between 25% and 35% in the milk-solids-not-fat-other-than-lactose and water phase. To illustrate with the above table, we know from column II of the table that we would have 22% of milk-solids-not-fat-other-than-lactose after centrifuging the material of the composition in column I of the table and can calculate the total pounds of water required to be combined with this 22% (milk-solids-not-fat-other-than-lactose) to give a percentage of 33 in the milk-solids-not-fat-other-than-lactose and the total water required, which latter is 44.7 pounds (column III of the table). Also knowing from column II that we would have 33.2 pounds of water per 100 pounds of the composition, we can find by subtracting the weight (33.2) from the total pounds of water required (namely 44.7 pounds), the pounds of water to add to give the desired percentage of water, and which required amount of water to be added in the selected example is 11.5 pounds (column IV of the table) for each 100 pounds of the condensed milk in column II of the table.

By a reverse procedure, the total pounds of preserving sugar required, namely 54.6 pounds (column III of the table), to combine with this 44.7 pounds of water to give a 55% preserving sugar ratio, can be determined by knowing the pounds of sugar first added and present in the condensed skim milk after and if the latter had been centrifuged, namely 32.4 pounds, as shown in column II, and subtracting these amounts of sugar gives the pounds of additional sugar required to be added for preserving purposes, namely 22.2 as in column IV, for each 100 pounds of the condensed milk in column II to make up the total of 54.6 pounds sugar.

Thus, by following this procedure and a table, as above, the proper amount of preserving sugar and water may be determined which is to be added to the condensed skim milk composition as may be shown in column I thereof, in order to give a material with the desired milk-solids-not-fat-other-than-lactose and preserving sugar and water ratios, as may be shown in column III of this table, and which when calculated out into percentages will be shown in column V.

Under conditions, where it is desirable to maintain higher preserving sugar ratios, such as 65%, the same procedure would be used as outlined above and a proportionate increase of preserving sugar would be used. If in actual practice higher or lower percentages of lactose were and were to be removed, the change in percentage composition would be related to the actual percentages being removed. It is desirable to use the higher preserving sugar ratio for conditions where the condensed skim milk will be stored at warm temperatures for extended periods of time and the lower percentage (55%) would be satisfactory for storage at the lower temperatures for shorter periods of time and it is not desirable to go below the extreme of 55% preserving sugar ratio in order to eliminate any possibility of bacterial growth during storage. Where the concentration of about 65% is used, particularly where there is a high milk-solids-not-fat-other-than-lactose ratio, there is a definite tendency for the preserving sugar to be thrown out of solution with aging of the condensed skim milk low in lactose.

The addition of sugar and water, above set forth, has been described in connection with introducing it to the condensed milk prior to the separation of the lactose crystals therefrom with the attended advantage of facilitating the removal of the crystals as well as preventing eventual excessive thickening, but the preserving sugar and water may be added in exactly the same manner and proportions, above described, after separation of the crystals from the condensed milk to prevent excessive thickening although with the loss of beneficial effect, above stated, during separation of the lactose.

While I have set forth above one manner in which the skim milk may be concentrated, it may be concentrated in any other manner known in the art, producing total milk-solids-not-fat sufficiently high to allow the lactose to be thrown out of solution upon standing. It is proposed that, among others, advantage may be taken of the impact of sterilization (commonly known as the Grindrod process) using abnormally high heat treatment which produces maximum fluidity for a relatively short duration of time immediately upon production of the concentrated skim milk and, thereafter, adding the preserving sugar and water in the manner above described in order to maintain that fluidity.

The sugar first added to the skim milk in the amount of about 5.9 pounds per 100 pounds of skim milk is for the purpose of preventing the milk from thickening in the condensing apparatus or vacuum pan and should, under optimum conditions, assist in the prevention of thickening during the crystallization stage of the lactose crystals, and which addition of sugar for this purpose has been heretofore suggested in the art. (See Leighton and Leviton Patent #1,952,017.)

I have discovered that by the addition to the condensed milk of a preserving sugar and water after crystallization, I am able to reduce its viscosity, which inevitably develops during the crystallizing stage, so as to remove the maximum amount of lactose crystals and, thereafter, prevent excessive thickening due to aging as well as bacterial spoilage.

Since the product obtained is highly concentrated, by at least five fold, I have found that, if all the preserving sugar were added to the skim milk prior to concentration, such a high concentration of milk solids as is desirable could not be obtained.

I have further found that where it is desired to dry the low lactose condensed skim milk instead of preserving the same in a fluid state, as above outlined, all of the steps above described may be followed with the exception of the second added sugar. Thus, by allowing the milk coming directly from the condensing apparatus to remain quiescent in the crystallizing tank, as previously explained, the formation of large crystals is produced and, before centrifuging this batch, I add water, free from objectionable impurities, in a quantity sufficient to reduce the condensed skim milk, containing the lactose crystals, to a condition of fluidity the same, or approximately the same, as that when it left the condensing apparatus. This state of fluidity can be readily determined by a visual test during the admixing as will be understood by those skilled in the art. But, the condensed skim milk, to which the water has been so added, should be promptly centrifuged to separate the lactose crystals and, after centrifuging, should be immediately dried because the addition of water alone accelerates the bacterial growth and will cause rapid spoilage.

What is claimed is:

1. In a process, of recovering lactose and preparing low-lactose concentrated milk from normal skim milk, which includes adding to the normal skim milk a water-soluble sugar having substantially higher solubility than lactose; concentrating the skim milk in a concentrating apparatus; then allowing the resulting concentrate to stand over quiescent conditions to effect the crystallization of the major portion of the lactose in the form of relatively coarse crystals approximating 0.11 m. m. or larger; subsequently diluting the concentrated mixture to reduce its viscosity to render it fluid for separation; and then separating the crystallized lactose from the concentrated milk, thus obtaining a low-lactose concentrated milk; said concentrating and standing quiescent stages being preceded and maintained by precautions against spontaneous seeding.

2. In a process, of recovering lactose and preparing low-lactose concentrated milk from normal skim milk, which includes adding to the normal skim milk a water-soluble sugar having substantially higher solubility than lactose; concentrating the skim milk in a concentrating apparatus; then allowing the resulting concentrate to stand under quiescent conditions in an ambient room temperature to effect the crystallization of the major portion of the lactose in the form of relatively coarse crystals approximating 0.11 m. m. or larger; subsequently diluting the concentrated mixture to reduce its viscosity to render it fluid for separation; then separating the crystallized lactose from the concentrated milk, thus obtaining a low-lactose concentrated milk; and then adding preservative sugar to the concentrated milk, said concentrating and standing quiescent stages being preceded and maintained by precautions against spontaneous seeding.

3. A process, of preparing lactose and stable low-lactose condensed milk from normal skim milk, which includes adding to the normal skim milk a water-soluble sugar having substantially higher solubility than lactose; concentrating the mixture thus obtained in a condensing apparatus; then allowing the resulting concentrate to stand under quiescent conditions, without previous stirring or cooling, to permit the major portion of the lactose to crystallize in the form of relatively coarse crystals approximately 0.11 m. m. or larger; then agitating and cooling the concentrated mixture, followed by a standing period, for precipitating an additional formation and growth of lactose crystals and diluting the concentrated mixture with a water solution of preserving sugar; and then separating the crystallized lactose from the concentrated milk, thus obtaining a low lactose condensed milk, said concentrating step and said first standing step being preceded and maintained by precautions against spontaneous seeding.

4. In a process, of preparing stable low-lactose condensed milk from normal skim milk, which includes concentrating the skim milk to remove the water therein to obtain a condensed product containing approximately 70% or more of total solids; then allowing the condensed products to stand in a quiescent state in an environment which is at room temperature, without previous stirring or cooling, for effecting the crystallization of the major portion of the lactose to relatively large crystals as will not pass through a screen about 200 mesh per inch; subsequently centrifuging the major portion of the crystalline lactose from the condensed product; and adding a water solution of preserving sugar to the condensed product after said quiescent standing period and before centrifuging, said addition of said sugar solution being in quantities sufficient to produce in the finished condensed low-lactose skim milk a concentration of preserving sugar in the water and preserving sugar combination of substantially between 55% and 65% by weight of the sum of the weights of the water and the preserving sugar; the said added sugar being water soluble and having substantially higher solubility than lactose; said concentrating and standing steps being preceded and maintained by precautions against spontaneous seeding.

5. In a process, of preparing lactose and stable low-lactose powdered milk from normal skim milk, which includes adding to the normal skim milk a water-soluble sugar having substantially higher solubility than lactose; concentrating the mixture thus obtained in a condensing apparatus to about 5 to 1; then allowing the resulting concentrate to stand under quiescent conditions, in a vessel outside of the condensing apparatus and in an environment which is at ordinary room temperatures, without previous stirring or cooling, to crystallize out the major portion of the lactose in the form of relatively coarse crystals approximately 0.11 m. m. or larger; agitating the concentrate followed by a standing period; adding water to the condensed product after crystallization of the lactose to reduce its viscosity; then centrifuging the diluted condensed product to separate the crystallized lactose from the low-lactose milk thus obtained; and then drying the low-lactose milk to a powder; said concentrating and first standing steps being preceded and maintained with precautions against spontaneous seeding.

6. The process, of preparing lactose and stable low-lactose condensed milk from normal skim milk, which comprises adding to each one hundred parts by weight of the normal skim milk substantially six parts by weight of a water soluble sugar having a substantially higher solubility than lactose; concentrating the mixture thus obtained to a concentration of substantially approximately 70% to 75% of total solids by continuous evaporation for about two to three hours under vacuum at elevated temperature; then allow the resulting concentrate to stand under quiescent conditions, without previous stirring or cooling, to crystallize out the major portion of the lactose in the form of relatively coarse crystals approximately 0.11 m. m. or larger; then agitating and cooling the concentrated mixture and allow to stand; then adding a water solution of preserving sugar to the condensed milk, after crystallization of the lactose, in amounts sufficient to produce a finished product having a concentration of preserving sugar in the water and preserving sugar combination of substantially between 55% and 65% by weight of the sum of the weights of the water and the preserving sugar; and then centrifuging the mixture to separate the crystallized lactose from the evaporated low-lactose milk, thus obtained, which after said separation step is substantially free from lactose particles which fail to pass a standard wire mesh screen having about 200 meshes per inch and is low in lactose content; said concentrating and first standing steps being preceded and maintained with precautions against spontaneous seeding.

KEITH CARTLEDGE THORNELOE.